US006738073B2

United States Patent
Park et al.

(10) Patent No.: US 6,738,073 B2
(45) Date of Patent: May 18, 2004

(54) CAMERA SYSTEM WITH BOTH A WIDE ANGLE VIEW AND A HIGH RESOLUTION VIEW

(75) Inventors: Michael C. Park, Portland, OR (US); G. David Ripley, Portland, OR (US)

(73) Assignee: iMove, Inc., Portland, OR (US)

( * ) Notice: Subject to any disclaimer, the term of this patent is extended or adjusted under 35 U.S.C. 154(b) by 0 days.

(21) Appl. No.: 10/136,659

(22) Filed: Apr. 30, 2002

(65) Prior Publication Data

US 2002/0180759 A1 Dec. 5, 2002

Related U.S. Application Data

(63) Continuation-in-part of application No. 09/994,081, filed on Nov. 23, 2001, and a continuation-in-part of application No. 09/992,090, filed on Nov. 16, 2001, and a continuation-in-part of application No. 09/697,605, filed on Oct. 26, 2000, and a continuation-in-part of application No. 10/003,399, filed on Oct. 22, 2001, and a continuation-in-part of application No. 09/971,950, filed on Oct. 5, 2001, which is a continuation-in-part of application No. 09/338,790, filed on Jun. 23, 1999, now Pat. No. 6,323,858, said application No. 10/003,399, is a continuation of application No. 09/310,715, filed on May 12, 1999, now Pat. No. 6,337,683

(60) Provisional application No. 60/343,405, filed on Oct. 19, 2001.

(51) Int. Cl.[7] .................................................. G09G 5/00
(52) U.S. Cl. ......................................... 345/629; 348/36
(58) Field of Search ................................ 345/418, 629, 345/474, 660; 348/38, 39, 36; 141/94

(56) References Cited

U.S. PATENT DOCUMENTS 3,909,121 A  9/1975  Cardoso
4,807,158 A  2/1989  Blanton et al.
4,853,764 A  8/1989  Sutter (List continued on next page.)

OTHER PUBLICATIONS

Chen (QuickTime VR—An Image–Based Approach to Virtual Environment Navigation).—ACM–0–89791–701–4/95/008 –1995.*

Primary Examiner—Mark Zimmerman
Assistant Examiner—Enrique L Santiago
(74) Attorney, Agent, or Firm—Fenwick & West LLP

(57) ABSTRACT

An improved surveillance system which includes a multi-lens camera system and a viewer. The camera system includes a plurality of single lens cameras each of which have a relatively wide angle lens. These single lens cameras simultaneously capture images that can be seamed into a panorama. The camera system also includes a high resolution camera (i.e. a camera with a telephoto lens) that can be pointed in a selected direction that is within the field of view of the other cameras. The system displays a view window into the panorama that is created from images captured by the wide angle lenses. The image from the high resolution camera is either superimposed on top of the panoramic image or it is displayed on a separate monitor. If it is displayed in the panorama, the higher solution image is positioned at the point in the panorama which is displaying the same area in space at a lower resolution. Thus an operator sees a relatively low resolution panorama; however, a selected portion of the panorama is displayed at a high resolution. An operator can point the high resolution camera toward any desired location, thereby providing an output which shows more detail in a selected area of the panorama.

21 Claims, 14 Drawing Sheets

U.S. PATENT DOCUMENTS

| | | | |
|---|---|---|---|
| 5,023,725 A | * 6/1991 | McCutchen | 348/38 |
| 5,130,794 A | * 7/1992 | Ritchey | 348/39 |
| 5,235,198 A | 8/1993 | Stevens | |
| 5,329,616 A | 7/1994 | Silverbrook | |
| 5,355,450 A | 10/1994 | Garmon | |
| 5,495,576 A | 2/1996 | Ritchey | |
| 5,541,773 A | 7/1996 | Kamo | |
| 5,563,649 A | 10/1996 | Gould | |
| 5,650,814 A | 7/1997 | Florent et al. | |
| 5,657,073 A | 8/1997 | Henley | |
| 5,677,981 A | 10/1997 | Kato | |
| 5,684,937 A | 11/1997 | Oxaal | |
| 5,703,604 A | 12/1997 | McCutchen | |
| 5,708,469 A | 1/1998 | Herzberg | |
| 5,729,471 A | 3/1998 | Jain | |
| 5,748,121 A | 5/1998 | Romriell | |
| 5,774,569 A | * 6/1998 | Waldenmaier | 348/143 |
| 5,852,673 A | 12/1998 | Young | |
| 5,872,575 A | 2/1999 | Segal | |
| 5,886,745 A | 3/1999 | Muraji | |
| 5,903,782 A | 5/1999 | Oxaal | |
| 5,933,137 A | 8/1999 | Anderson | |
| 5,936,630 A | 8/1999 | Oxaal | |
| 5,990,934 A | 11/1999 | Nalwa | |
| 6,002,430 A | 12/1999 | McCall et al. | |
| 6,043,837 A | 3/2000 | Driscoll, Jr. et al. | |
| 6,058,397 A | 5/2000 | Barrus | |
| 6,101,534 A | 8/2000 | Rothschild | |
| 6,118,454 A | 9/2000 | Oxaal | |
| 6,118,474 A | * 9/2000 | Nayar | 348/36 |
| 6,157,385 A | 12/2000 | Oxaal | |
| 6,215,519 B1 | 4/2001 | Nayar et al. | |
| 6,226,035 B1 | * 5/2001 | Korein et al. | 348/36 |
| 6,237,647 B1 | * 5/2001 | Pong et al. | 141/94 |
| 6,243,099 B1 | 6/2001 | Oxaal | |
| 6,271,853 B1 | 8/2001 | Oxaal | |
| 6,323,858 B1 | 11/2001 | Gilbert | |
| 6,323,862 B1 | 11/2001 | Oxaal | |
| 6,337,683 B1 | 1/2002 | Gilbert | |
| 6,346,950 B1 | * 2/2002 | Jouppi | 345/660 |

* cited by examiner

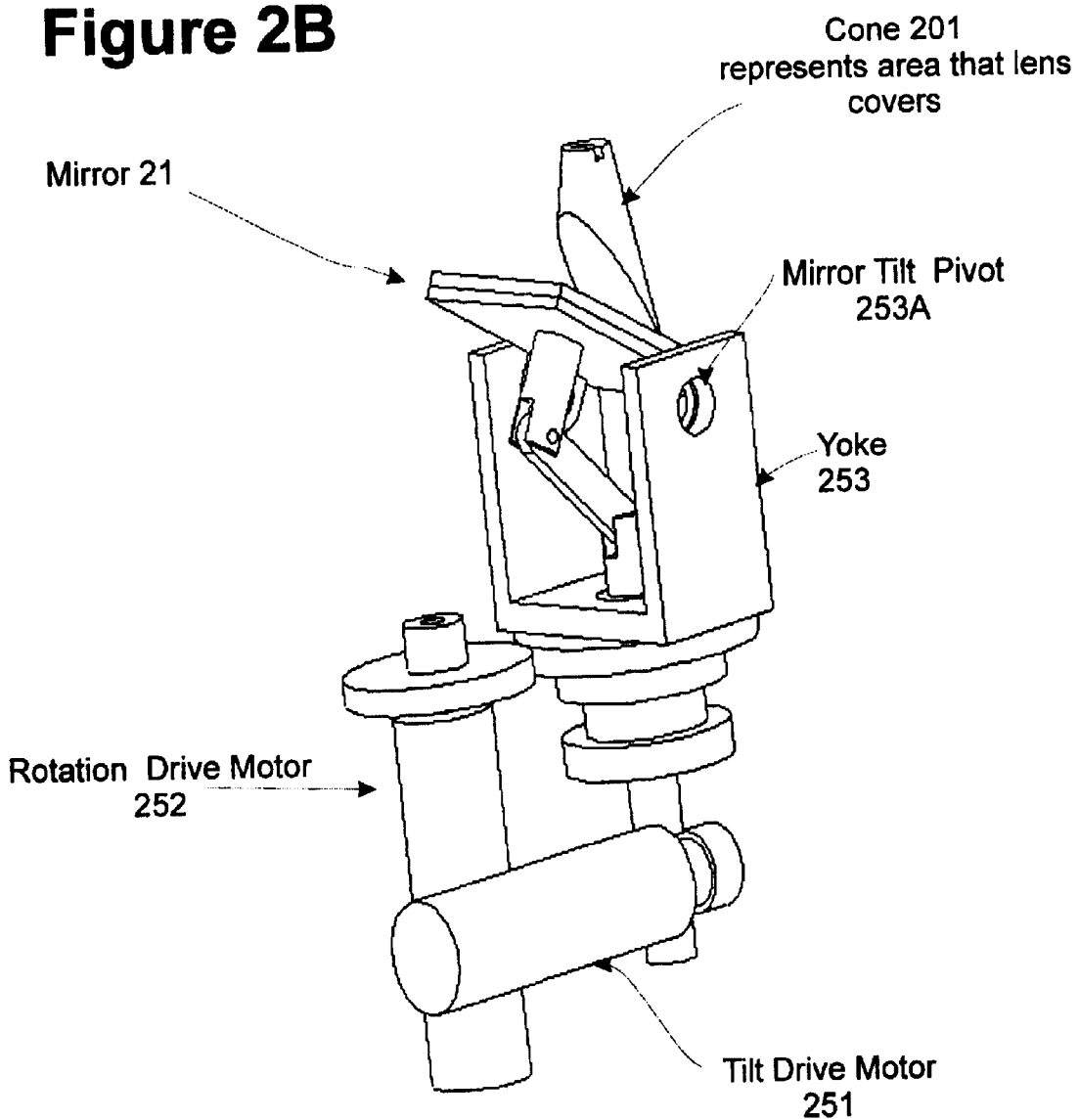

The Panoramic Image 301

A 360 degree by 135 degree Spherical Panorama consisting of 2048 by 768 pixels

View window Portion 302 of Panorama 301 a 90° by 60° portion consisting 512 by 341 pixels

High Resolution Image 303 a ten degree by ten degree image consisting of 768 by 768 pixels

| Position Number | Position of the High Resolution Image | Corresponding Position in the Panorama |
|---|---|---|
| 1 | 10.0 degrees rotation<br>5.45 degrees tilt<br>Zoom equals 5 | coordinates 343, 243,342 |
| 2 | | |
| 3 | | |
| 4 | | |
| 5 | | |
| 6 | | |
| 7 | | |
| 8 | | |
| ect. | | |

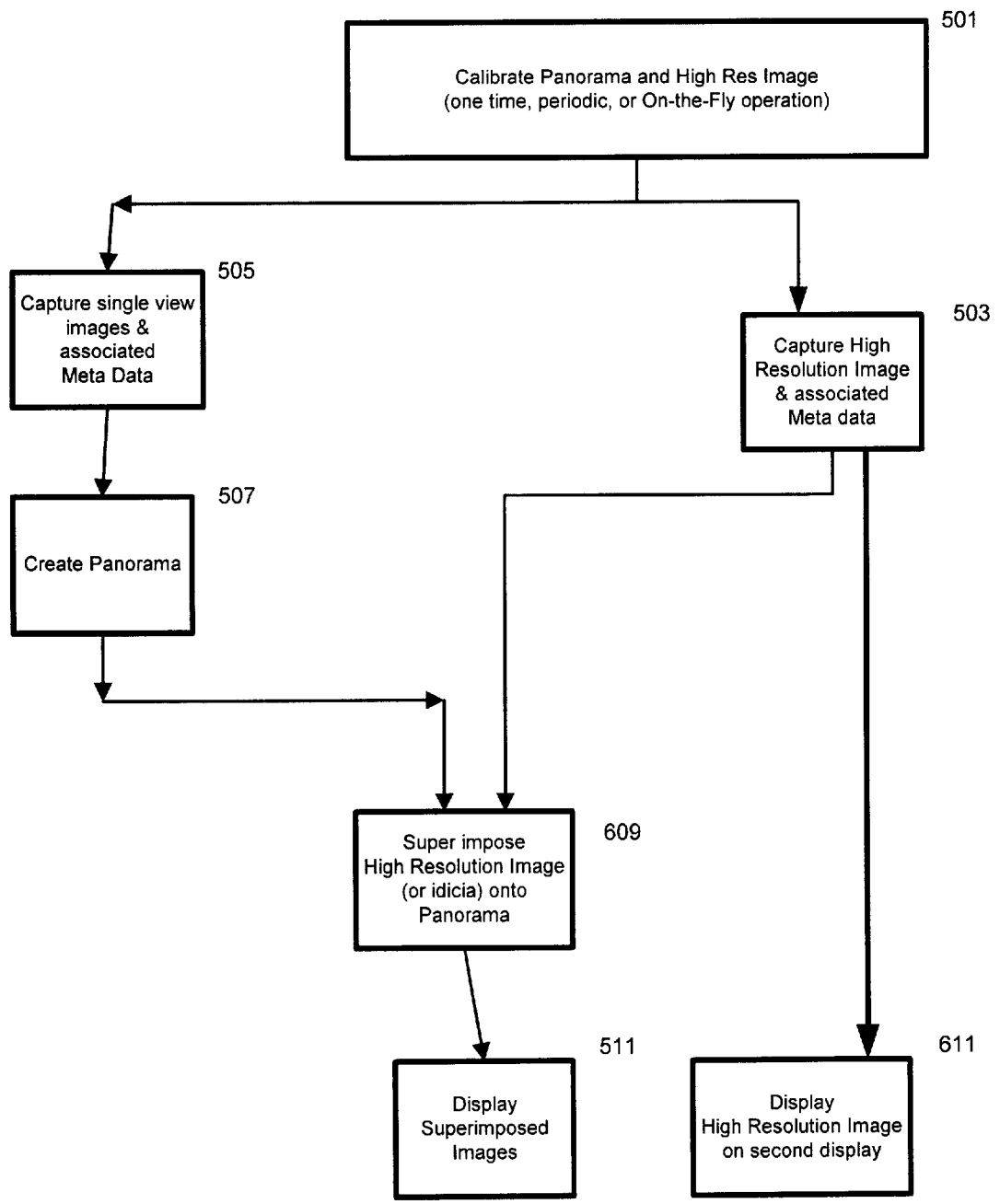

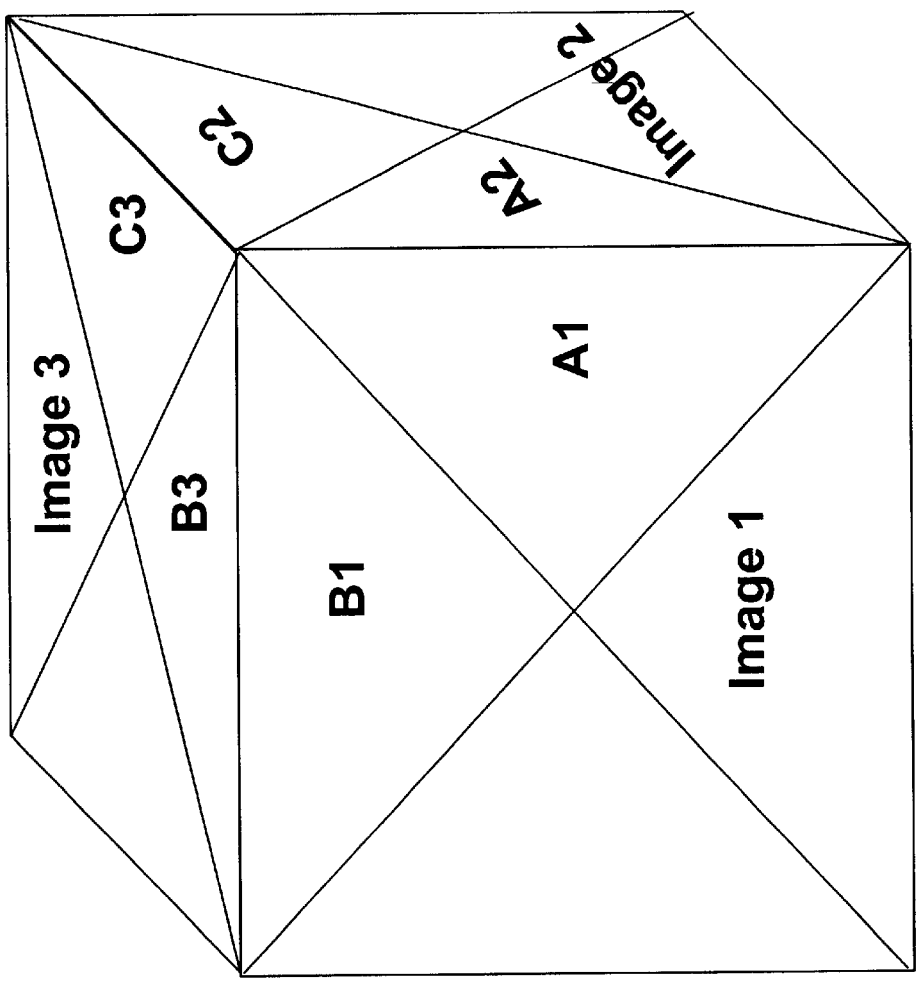
Figure 7. Blending regions for individually-exposed images

CAMERA SYSTEM WITH BOTH A WIDE ANGLE VIEW AND A HIGH RESOLUTION VIEW

RELATED APPLICATIONS

This application is a non-provisional application of provisional application No. 60/343,405 filed Oct. 19, 2001.

This application is also a continuation in part of the following applications:

a) Ser. No. 09/992,090 filed Nov. 16, 2001 entitled "Camera System with High Resolution Inside a Wide angle View.

b) Ser. No. 09/994,081 filed Nov. 23, 2001 entitled "Camera System with High Resolution Inside a Wide angle View.

c) Ser. No. 09/971,950 filed Oct. 5, 2001 which is a continuation of Ser. No. 09/338,790 filed Jun. 23, 1999 now U.S. Pat. No. 6,323,858 entitled: "A System for Digitally Capturing and Recording Panoramic Images".

d) Ser. No. 10/003,399 filed Oct. 22, 2001 which is a continuation of application Ser. No. 09/310,715 filed May 12, 1999 entitled: "Panoramic Movies which Simulate Movement Through Multi-Dimensional Space".

e) Ser. No. 09/697,605 filed Oct. 26, 2000 entitled: "System and Method for camera calibration".

The content of the above applications including any appendices filed therewith is hereby incorporated herein by reference and priority to the above listed applications is claimed.

FIELD OF THE INVENTION

The present invention relates to photography and more particularly to photography utilizing multi-lens panoramic cameras.

BACKGROUND OF THE INVENTION

Co-pending patent application Ser. No. 09/338,790 filed Jun. 23, 1999 entitled: "A System for Digitally Capturing and Recording Panoramic Images" describe a system for simultaneously capturing a plurality of images that can be seamed together into a panorama. With the system shown in application Ser. No. 09/338,790 a sequence images can be captured to create a panoramic movie.

Co-pending patent application Ser. No. 09/310,715 filed May 12, 1999 entitled: "Panoramic Movies which Simulate Movement Through Multi-Dimensional Space" describes how a views window into a sequence of panoramic images can be displayed to form a panoramic movie.

Images captured by a multi-lens camera can be seamed into panoramas "on the fly" as they are captured and a selected view window from the panorama can be viewed "on the fly" as the images are being captured. Such a system can be used for surveillance. Although the camera may be in a fixed position, it allows an operator to move the view window so that the operator can observe activity in any selected direction.

It is difficult if not impossible for wide-angle imaging systems to provide both wide Field of View (FOV) and high resolution. The primary benefit of spherical imaging systems is that the user can look in any direction and simultaneously view any object in reference to any other object in any direction within the environment. On the other hand, imaging systems with telephoto lenses (narrow FOV) that deliver high-resolution images can show only close-up (or narrow FOV) images without the context of wide angle or spherical views. With a high resolution system, one can, for example, read a license plate at 100 feet or recognize a human face at 100 yards. Such clarity is generally not possible when an image is captured with a wide angle lens.

It is theoretically technically possible to create a system with a large number of narrow field of view telephoto lenses which capture a large number of high resolution images which can be seamed into a spherical panorama. However, such a system would require a very large number of lenses and image sensors and it would produced billions of bytes of data every second, hence, it is generally not economically practicable to commercially build such a system.

SUMMARY OF THE PRESENT INVENTION

The present invention provides an improved surveillance system which includes a multi-lens camera system and a viewer. The camera system includes a plurality of single lens cameras each of which has a relatively wide angle lens. These single lens cameras simultaneously capture images that can be seamed into a panorama that covers the entire theater (i.e. area) of interest. The camera system also includes at least one high resolution camera (i.e. a camera with a telephoto lens) that can be pointed in a selected direction to provide a high resolution image of a selected area within the theater of interest.

The wide angle lenses capture wide angle images and provide an overall view of a theater of interest and the telephoto lens provides a high resolution image of a specific area of interest. Images are simultaneously captured by the wide-angle lenses and by the telephoto lenses. The direction of the telephoto lens is controllable by a person or by a computer.

The direction of the telephoto lens relative to that of the wide-angle lenses is recorded and associated with each image captured. This allows the telephoto image to be correctly overlaid on the wide-angle image.

In some embodiments, the overlay process utilizes previously obtained calibration information that exactly maps all possible directions of the telephoto images to appropriate corresponding positions in the wide-angle imagery. In order to achieve maximum accuracy the calibration operation can be performed for each individual camera system.

In some situations, the overlay process is improved when the high resolution images are captured by the narrow FOV lens at the same time that the panorama is captured by the wide area lens. In some embodiments, the narrow FOV lens has the ability to adjust its FOV (similar to a zoom lens) under electronic control.

In one embodiment, the system displays a selected view window (i.e. a selected part) from the panorama created from images captured by the wide angle lenses. The image from the high resolution camera is superimposed or overlaid on top of the panoramic image. The higher solution image is positioned at the point in the panorama which is displaying the same area in space at a lower resolution. Thus an operator sees a relatively low resolution panorama; however, a selected portion of the panorama is displayed at a high resolution. An operator can point the high resolution camera toward any desired location, thereby providing an output which shows more detail in a selected area of the panorama. The camera is pointed in a particular direction by orienting a mirror which reflects light into the high resolution camera.

In another embodiment, the panoramic image is displayed on one monitor and the high resolution image is displayed on a second monitor (or in two windows on the same monitor). The high resolution image can also be displayed on the monitor which shows the wide angle image as in the first embodiment, or alternatively, only a cross hair or other indicia can be displayed on the first monitor to show the location of the area covered by the high resolution camera.

The synchronized high-resolution imagery integrated into or on wide-angle reference provided by the present invention can be either a still or a motion picture system.

BRIEF DESCRIPTION OF THE DRAWINGS

FIGS. 2A, 2B and 2C are detailed diagrams of the mirror rotation system.

FIG. 4B is a illustration of a calibration table.

FIG. 6 is a flow diagram of a second embodiment.

FIG. 7 is a diagram illustrating blending images.

DETAILED DESCRIPTION

Two embodiments of the invention and a variety of alternatives will be described. In the first embodiment, there is a single monitor and both the high resolution image and the wide angle image are displayed on the single monitor. In the second embodiment, there are two monitors. The high resolution image is displayed on one monitor and the wide angle image is displayed on a second monitor. In still another embodiment that includes two monitors, both the wide angle image and the high resolution image are displayed on one monitor and the high resolution images is displayed on the second monitor.

Figure 1A:
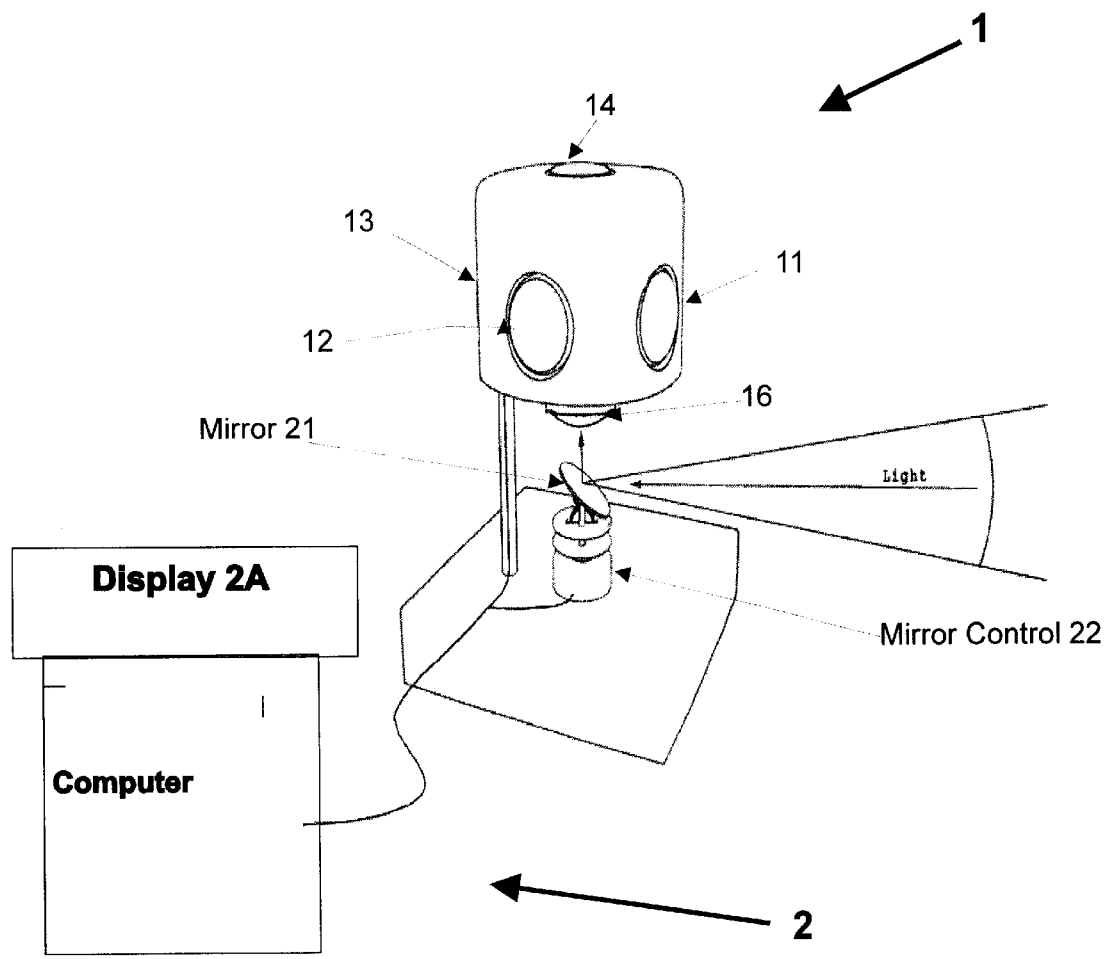
FIGS. 1A and 1B are overall views of the first and second embodiments

The first embodiment of the invention is shown in FIG. 1A and it will be describe first. A second embodiment shown in FIG. 1B will be described later. As shown in FIG. 1A, there are two main components in the system, namely, camera system 1 and computer system 2. A monitor 2A is connected to computer 2 and it displays images captured by camera system 1.

Camera system 1 includes six single lens cameras 11 to 16 pointing in six orthogonal directions. Single lens camera 15 which is not visible in FIG. 1 is directly opposite to single lens camera 12. Note single lens camera 13 is opposite to single lens camera 11. The single lens cameras 11 to 16 in effect face out from the six faces of a hypothetical cube. The single lens cameras are simultaneously activated to capture a set of images.

Each of the single lens cameras 11 to 15 has a diagonal field of view of 135 degrees and they are identical to each other. That is, each of the single lens cameras 11 to 15 has approximately a 95 degree horizontal and vertical field of view. Thus, the images captured by single lens cameras 11 to 15 have some overlap. Each of the cameras 11 to 15 effectively uses a 768 by 768 pixel detector. The actual detectors that are utilized in the preferred embodiment have a configuration of 1024 by 768 pixels; however, in order to obtain a square image, only a 768 by 768 portion of each detector is utilized. The images captured by single lens cameras 11 to 15 can be seamed into a panorama which covers five sixths of a sphere (herein called a panorama having a width of 360 degrees and a height of 135 degrees).

Figure 2A:
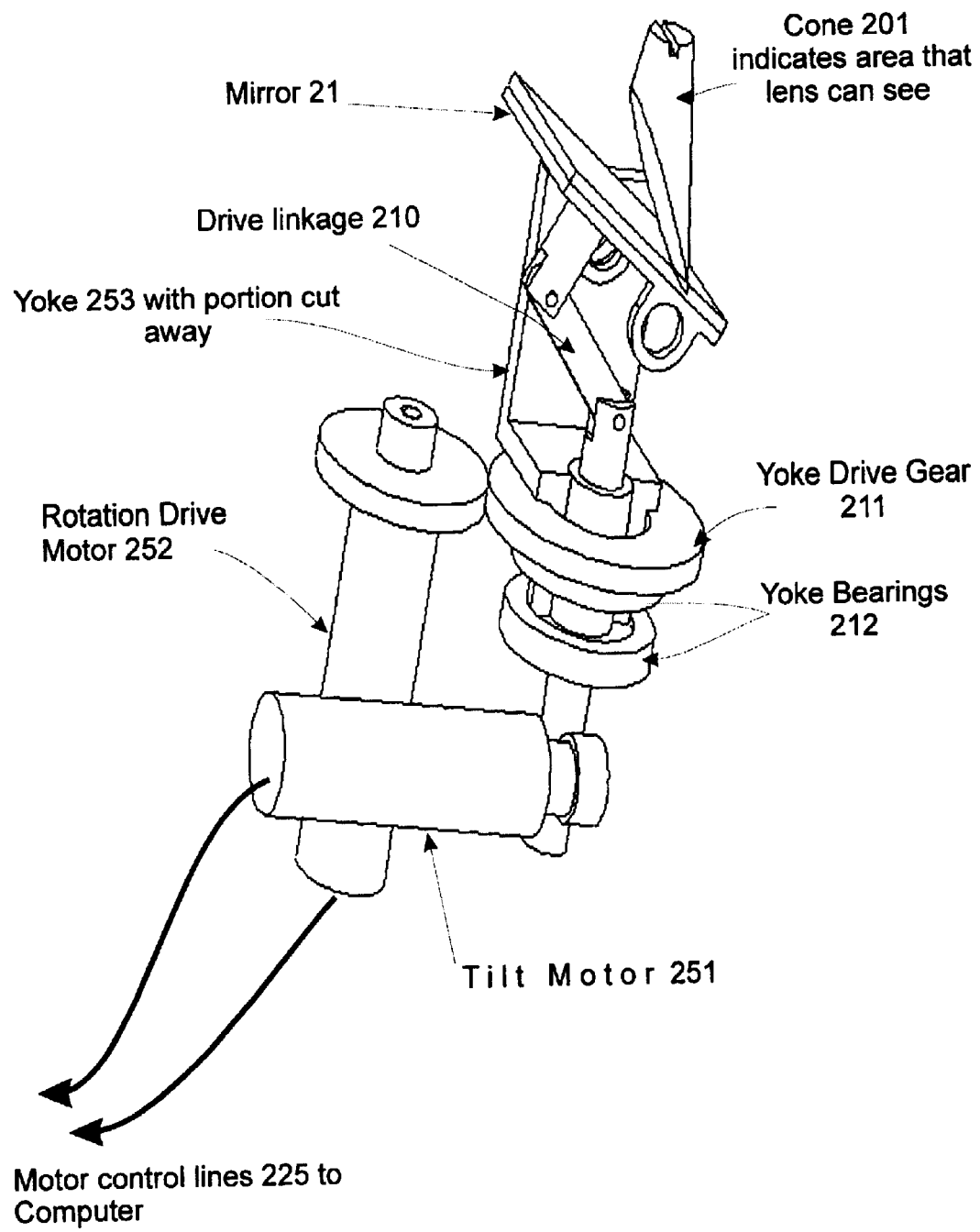
Figure 2C:
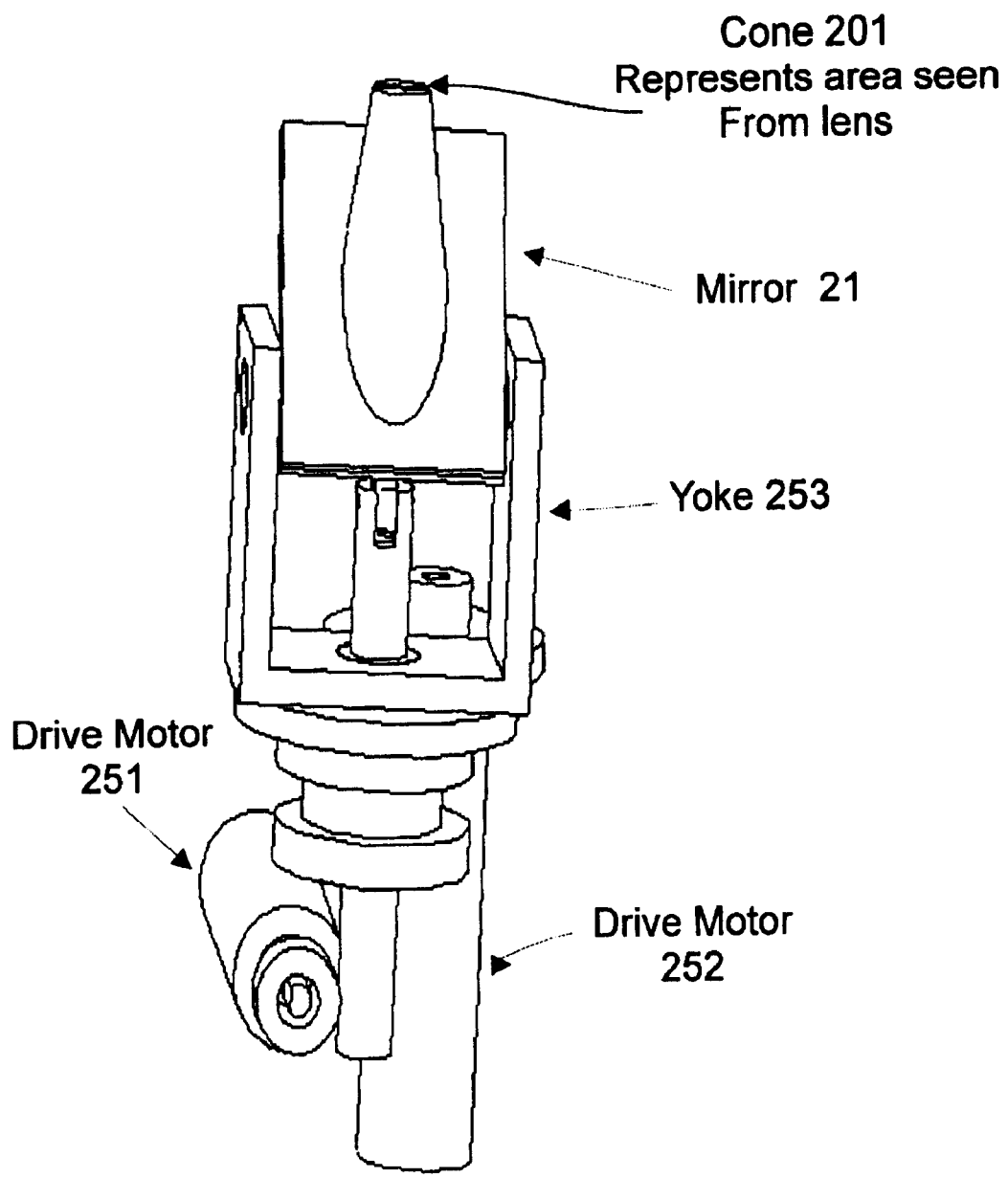

The single lens camera 16 faces down onto mirror 21. Camera 16 has a lens with a narrow field of view. Thus, single lens camera 16 can provide a high resolution image of a relative small area. In the first embodiment described herein single lens camera 16 has a telephoto lens with a 10 degree field of view. In an alternate embodiment, single view lens 16 is an electronically controlled zoom lens. Mirror 21 is movable as shown in FIGS. 2A, 2B and 2C. Thus the single lens camera 16 can be pointed at a particular selected area to provide a high resolution image of that particular area.

The details of how mirror 21 is moved is shown in FIGS. 2A, 2B and 2C. Two motors 251 and 252 control the orientation of the mirror 21 through drive linkage 210. Motor 251 controls the tilt of the mirror 21 and motor 252 controls the rotation of mirror 21. The motors 251 and 252 are controlled through drive lines 225 which are connected to control computer 2. Programs for controlling such motors from an operator controlled device such as a joystick are well known. The result is that the operator can direct the high resolution camera 16 toward any desired point.

Lens 16 is pointed toward mirror 21. The cone 201 is not a physical element. Cone 201 merely represents the area that is visible from or seen by high resolution lens 16.

The images provided by cameras 11 to 15 can be seamed into a panorama and then a selected view from within the panorama can be displayed on monitor 2A. The images from single view cameras 11 to 15 can, for example, be seamed using the technology described or the technology referenced in co-pending application Ser. No. 09/602,290 filed Jul. 6, 1999 entitled, "Interactive Image Seamer for Panoramic Images", co-pending application Ser. No. 09/970,418 filed Oct. 3, 2001 entitled "Seaming Polygonal Projections from Sub-hemispherical Imagery" and, co-pending application Ser. No. 09/697,605 filed Oct. 26, 2000 entitled "System and Method for Camera Calibration", the content of which is hereby incorporated herein by reference.

The single view camera 16 provides a high resolution image of a particular selected area. It is noted that this area which is visible from lens 16 is also included in the panorama captured by lenses 11 to 15. The area captured by single lens camera 16 can be changed by changing the orientation of mirror 21. The high resolution image of a selected area captured by single lens camera 16 is displayed on top of the panorama captured by lenses 11 to 15. It is displayed at the position in the panorama that coincides with the area being displayed in the high resolution image.

Figure 3A:
FIGS. 3A, 3B, 3C and 3D are diagrams illustrating a high resolution image superimposed on a panorama.

FIG. 3A illustrates an example of the pixel density at various stages in the process. That is FIG. 3A gives the pixel densities for one particular embodiment of the invention. (Note: in the following paragraphs underlined numbers represent numerical quantities and they do not coincide with part numbers in the diagrams).

The panorama 301 illustrated in FIG. 3A is a 360 degree by 135 degree panorama. The panorama 301 is the result of seaming together images from the five single view cameras 11 to 15. The panorama 301 consists of an array of 2048 by 768 pixels. The view window 302 through which a portion of the panorama can be viewed consists of a 90 degree by 60 degree portion of the panorama. The view window therefore utilizes the pixels in a 512 by 341 section of the panorama (note 2048 divided by 360/90 equals 512 and 768 divided by 135/60 equals 341). The high resolution image 303 consists of a 10 degree by 10 degree array consisting of 768 by 768 pixels.

When an image is displayed on a monitor, the image must be made to conform to the pixel arrangement of the monitor. The above discussion concerning pixels relates to the pixels in an image. For example, monitors in widespread use have an arrangement of 1024 by 768 pixels. Taking an image having a particular number of pixels as shown in FIGS. 3A and displaying it on a monitor which has a particular arrangement of pixels is conventional and is not described herein.

The viewer program described below takes the portion of the panorama in the view window 302 and the high resolution image 303 and renders them so that the high resolution image is overlaid on the panorama for display on monitor 2A.

It is noted that in the described embodiment, the portion of the sensors which is utilized each produce an image with 768 by 768 pixels. Some pixels are discarded when making the 2048 by 768 panorama. Other embodiments could utilize more of the pixels and generate a panorama of somewhat higher resolution.

Figure 3B:
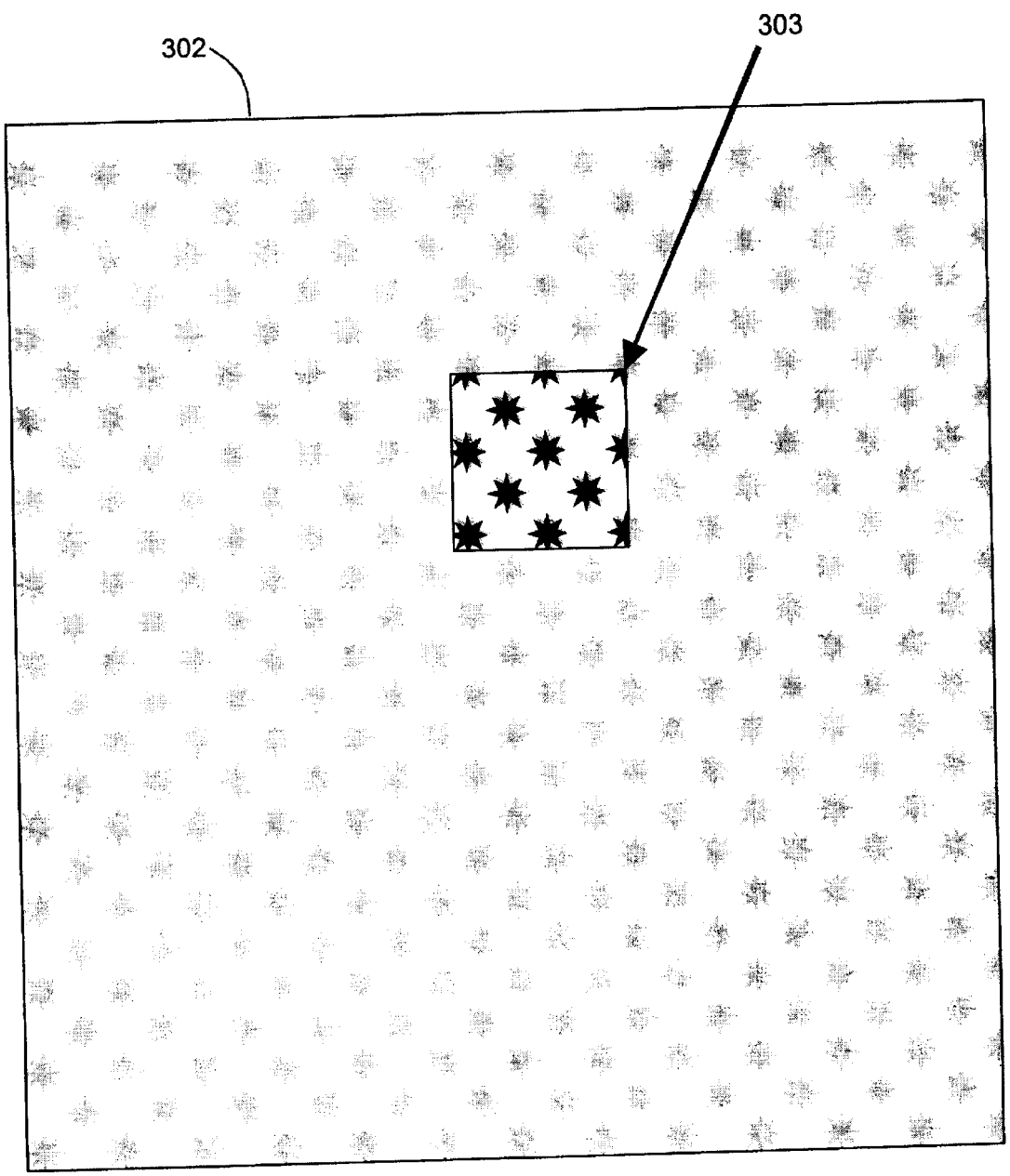

FIG. 3B illustrates a view window (i.e. a selected portion 302) of a panorama 301 displayed with a high resolution image 303 overlaid on the panorama at a particular location. The point illustrated by FIG. 3B is that the image is more clearly displayed in the portion of the image where the high resolution image has been overlaid on the panorama. It should be clearly understood that the stars in FIG. 3B do not represent image pixels. FIG. 3B is merely an illustration of a test pattern, illustrating that the image is more clearly visible in the high resolution area 303. The differences between a high resolution and a low resolution image are well-known in the art. The point illustrated by FIG. 3B is that the high resolution image 303 is displayed surrounded by a low resolution portion 302 of panorama 301. The low resolution area which surrounds the high resolution image provides an observer with perspective, even though the detail of objects in the low resolution portion of the display is not visible.

The entire panorama 301 (only a portion of which is visible in FIG. 3B) was created by seaming together the images captured at a particular instant by single lens cameras 11 to 15. It is noted that the size of the view window into the panorama can be large or small as desired by the particular application. In a surveillance situation the view window could be as large as allowed by the display unit that is available. In an ideal situation the entire panorama would be displayed. As a practical matter usually only a relatively small view window into a panorama is displayed.

The panorama has a relatively low resolution. That is, the pixels which form the panorama, have a relatively low density. For example the panorama may have a resolution of 1600 pixels per square inch. However, utilizing the present invention one area covered by the panorama is also captured in a higher resolution. The high resolution area has more pixels per inch and provides greater detail of the objects in that area. In the high resolution area the pixels may have a resolution of 16,000 pixels per square inch.

The high resolution image 303 is superimposed upon the panoramic image at the position in the panorama that coincides with the same area in the panorama. The high resolution image provides a more detailed view of what is occurring at that position in space. The orientation of the high resolution image is made to coincide with the orientation of the panorama at that point. It should be understood that the objects in the panorama and the corresponding objects in the high resolution image are positioned at the same place in the display. The difference is that in the high resolution area there is a much higher density of pixels per unit area. Thus, in order to fit into the panorama, the high resolution image is expanded or contracted to the correct size, oriented appropriately and other distortion is accounted for so that the entire high resolution image fits at exactly the correct position in the panorama.

Figure 3C:
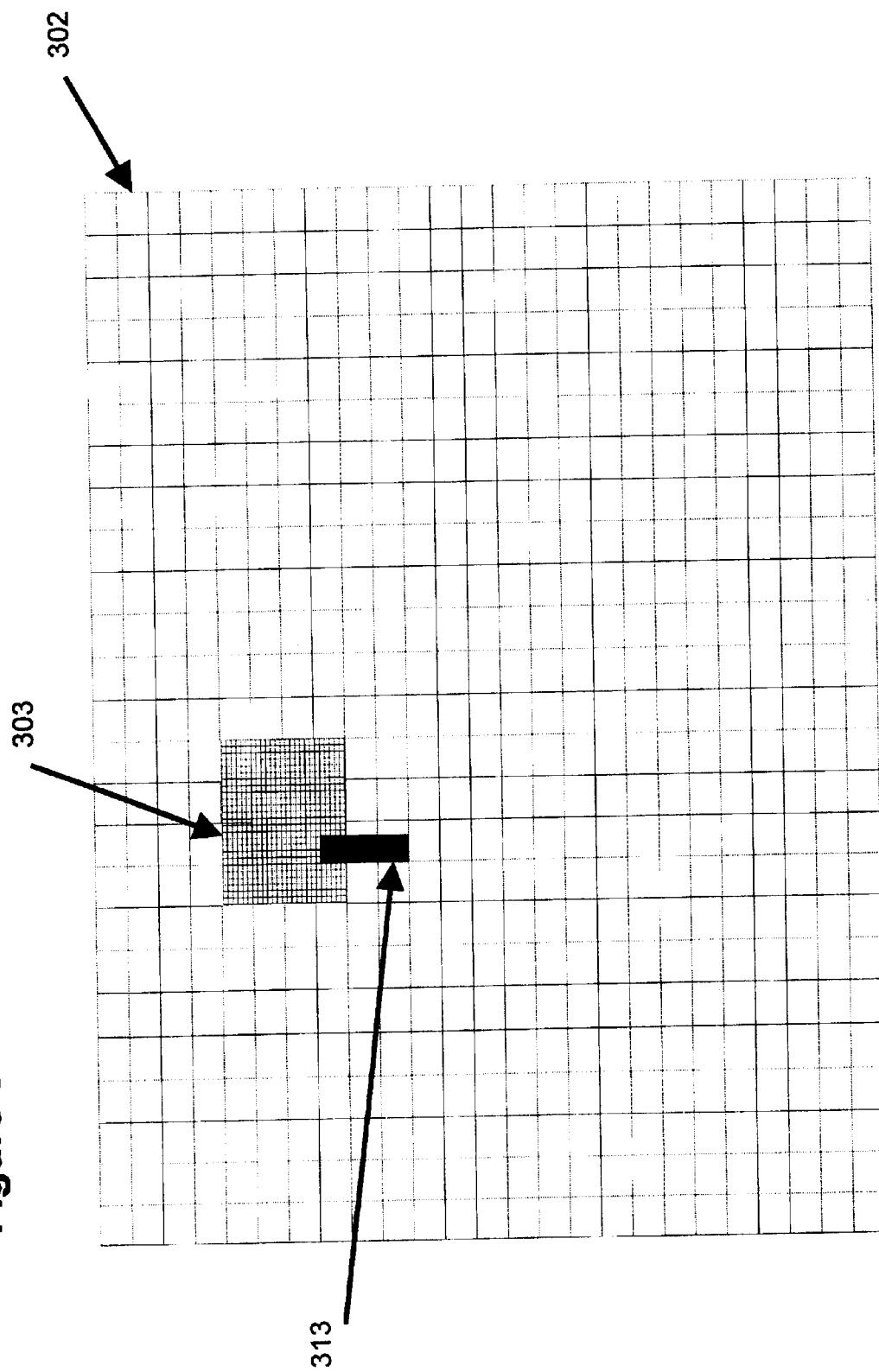

FIG. 3C illustrates the fact that the high resolution image is superimposed on the panorama in such a way that there is not a discontinuity in the image across the boundary between the high resolution and the low resolution portions of the display. In FIG. 3C, an object 313 extends across the boundary between the low resolution portion of view window 302 and the high resolution image 303. The high resolution image 303 is inserted into the panorama at such a location and with such an orientation and scale that the edges of object 313 are continuous as shown in FIG. 3C. As explained later the combination of calibration data for the camera and meta data that accompanies the high resolution image allows the system to insert the high resolution image correctly in the panorama.

By having the high resolution image in the panorama as provided by the present invention, a user can both (a) see in great detail the limited area provided by high resolution image and (b) see the surrounding area in the panorama in order to have perspective or context. That is, by seeing the part of the panorama that surrounds the high resolution image the observer is given perspective, even though the panorama is at a relatively low resolution.

It is noted that while it might be desirable to have a high resolution view of the entire area covered by the panorama, in practical cost effective systems that is not possible. It is a fact that (a) from a practical point of view, the quality of the lenses that are available is limited, and (b) sensors with only a certain number of pixels are commercially and practically available. Given facts "a" and "b" above, it follows that a camera with a small view angle will give the best available high resolution image for a particular area. If one wanted to create an entire high resolution panorama from such high resolution images, an inordinate and impractical number of such cameras would be necessary.

The present invention makes use of commercially available sensors and lenses and yet provides the user with an excellent view of a selected area and with perspective and content from a panorama. With the present invention a limited number of sensors and wide angle lenses are used to record a panorama. A similar sensor with narrow angle lens provides the high resolution image for the position or area of most interest.

It should be noted that while the embodiment described herein includes only one high resolution single view camera, alternate embodiments could use two or more high resolution cameras to provide high resolution images of a plurality of selected areas in the panorama.

With this system an operator can view a panorama or more usually a part of a panorama visible in a view window into the panorama. When the operator notices something of interest, he can direct the high resolution camera to the area of interest and see a high resolution image of the area of interest superimposed on the panorama. He can then move the area covered by the high resolution image by merely directing the movement of mirror 21. Thus the panorama provides background and perspective while the high resolution image provides detailed information.

The unit including the single lens cameras 11 to 16 may be similar to the six lens camera shown in co-pending application Ser. No. 09/338,790 filed Jun. 23, 1999 entitled: "A System for Digitally Capturing and Recording Panoramic Images" except that instead of having six identical lenses as the camera shown in the above referenced patent application, with the present invention lens 16 is a narrow angle telephoto lens.

The six single lens cameras operate in a coordinated fashion. That is, each of the single lens cameras captures an image at the same time. In order to provide flicker free operation, the cameras would operate at a frame rate of about 15 frames per second; however, the frame rate could be slower if less bandwidth is available or it could be faster if more bandwidth is available. As explained later in some environments the high resolution camera could operate at a different frame rate than the single view cameras which capture the images that are seamed into a panorama.

Figure 4A:
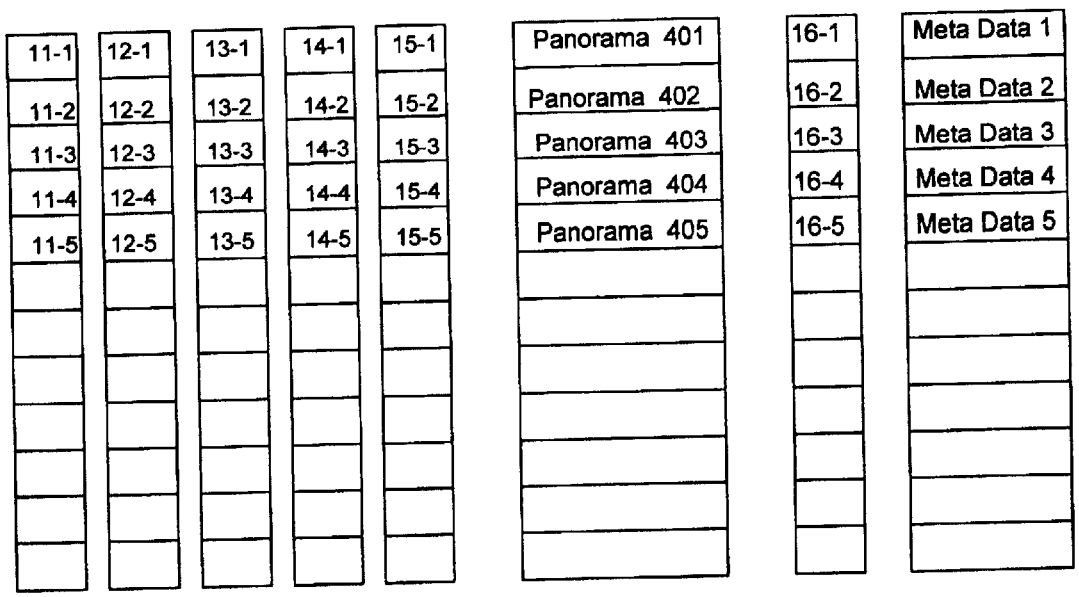
FIG. 4A is a diagram illustrating the coordination between the various single view images.

Each camera generates a series of images as shown in FIG. 4. The rectangles designated 11-1, 11-2, 11-3 etc. represent a series of images captured by single lens camera 11. Likewise images 12-1, 12-2, 12-3 etc are images captured by single lens camera 12. The images captured by camera 13, 14, 15 and 16 are similarly shown. Images 11-1, 12-1, 13-1, 14-1, 15-1, and 16-1 are images that were captured simultaneously. Likewise all the images with suffix 2 were captured simultaneously etc. Images 11-1, 12-1, 13-1, 14-1 and 15-1 were seamed into a panorama 401. A view window from panorama 401 and the high resolution image 16-1 are simultaneously displayed on monitor 2A.

Meta data is recorded along with each set of images. Meta data 1 is recorded along with images 11-1, 12-1 to 16-1. The meta data includes data that gives the location and other characteristics of the associated high resolution image. That is, meta data 1 gives information about image 16-1. The meta data (together with calibration data not shown in FIG. 4) provides the information that allows the system to correctly orient and position the high resolution image in the panorama.

The panoramas 401, 402, 403, etc. can be sequentially displayed in the form of a panoramic movie of the type described in co-pending application Ser. No. 09/310,715 filed May 12, 2001 and entitled "Panoramic Movies Which simulate Movement Through Multi-Dimensional Space". The images can be shown essentially simultaneously with their capture (the only delay being the time required to process and seam the images). Alternatively the images can be stored and displayed later. The corresponding image from the high resolution camera is displayed as each panorama is displayed. That is, when some portion of panorama 401 is displayed, image 16-1 is superimposed on the panorama at the appropriate location. If desired, instead of seeing a series of images, a user can select to view a single panorama together with its associated high resolution image.

It is essential that the position of camera 16 be coordinated with positions in the panoramic images generated from images captured by the other single lens cameras. That is, each possible position of mirror 21 is indexed or tied to a particular position in a seamed panorama. This calibration is done prior to the use of the camera. It can also be done periodically if there is any wear or change in the mechanical or optical components. During the calibration step a table such as that shown in FIG. 4B is generated. This table provides an entry for each possible position of mirror 21. For each position of mirror 21, the table provides the coordinates of the location in the panorama where the high resolution image should be positioned. The numbers given in FIG. 4B are merely illustration. In a particular embodiment of the invention, the table would give numbers that specify locations in the particular panorama.

In a relatively simple embodiment the entries in the table shown in FIG. 4B can be determined manually. This can be done manually by (a) positioning the mirror at a particular location, (b) capturing a panorama and a high resolution image, (c) viewing an appropriate view window in the resulting panorama and the high resolution image, and (d) manually moving, stretching and turning the high resolution image in the panorama until there are no discontinuities at the edges. This can be done using the same kind of tool that is used to insert hot spots in panoramic images. Such a tool is commercially available from iMove Corporation as part of the iMove Panoramic Image Production Suite.

The number of allowed positions for mirror 21 can be at any desired granularity. The mirror 21 has two degrees of freedom, namely rotation and tilt. An entry in the table can be made for each degree of rotation and for each degree of tilt. With such an embodiment, images would only be captured with the mirror at these positions.

In an alternate embodiment, the calibration is be done automatically. In the automatic embodiment, the camera is placed inside a large cube, each face of which consists of a test pattern of lines. These images are then seamed into a panorama which will form a large test pattern of lines. The high resolution camera is directed at a particular location. A pattern matching computer program is then used to determine where the high resolution image should be placed so that the test pattern in the high resolution image matches the test pattern in the panorama.

Calibration may also be accomplished in an open, real world environment by taking sample images at a series of known directions then analyzing the imagery to determine correct placement of telephoto image over wide area image. This is most useful when the wide area image sensors are physically distributed around a vehicle (such as an aircraft, ship, or ground vehicle) or building.

In still another embodiment, computerized pattern matching is used between objects in the panorama and objects in the high resolution image to position the high resolution image. The pattern matching can be done using a test scene to construct a calibration table such as that previously described. Alternatively, the calibration step can be eliminated and the pattern matching program can be used to position the high resolution image in a panorama being observed.

In still another embodiment, calibration is accomplished by placing the system of cameras within an image calibration chamber that has known and exact imaging targets in all directions 360 degrees by 180 degrees. By computer controlled means the Narrow FOV camera is directed to point in a particular direction X,Y,Z (X degrees on horizontal axis and Y degrees on vertical axis, Z being a FOV value) and take a picture. The Wide FOV camera that has the same directional orientation simultaneously takes a picture. The resulting two images are pattern matched such that the Narrow FOV image exactly and precisely overlays the Wide FOV image. The calibration values determined typically include heading, pitch, rotation, basic FOV, inversion, and any encountered lens distortions. However, different embodiments may utilize different calibration values. The calibration values are generally determined and stored for each direction X,Y,Z value. The Z value is the zoom of the telephoto lens.

A series of calibration values are determined for each allowed Narrow FOV setting (e.g. 30 down to 1 degree FOV). Each series would contain calibration values for each possible direction of the Narrow FOV lens. The number of possible directions is determined by the FOV of the Narrow FOV lens and the physical constraints of the Narrow FOV direction controlling mechanism.

Once the calibration table has been constructed, one can use the calibration data to position the high resolution image at the correct position in the panorama. When a combination of a panorama and a high resolution image is captured, the position of the mirror is recorded as part of the meta data recorded with the images. The mirror position is then used to interrogate the calibration table to determine where in the panorama the high resolution image should be placed.

If the system includes a telephoto zoom lens, the calibration is done at each zoom setting of the telephoto lens. If the system includes more than one high resolution lens, the calibration is done for each of the high resolution lenses.

In one embodiment, the high resolution image is transformed using the same transformation used to construct the panorama. The high resolution image can then be place in the panorama at the correct position and the high resolution image will properly fit since it has undergone the same transformation as has the panorama. Both images can then be rendered for display using a conventional rendering algorithm.

Rendering can be done faster using the following algorithm and program which does not transform the high resolution image using a panoramic transform. It is noted that the following algorithm allows a high resolution image to be placed into a series of panoramic images.

The following rendering algorithm overlays (superimposes) a high resolution image (herein termed an AVI video image) onto a spherical video image at a designated position and scale within the spherical space, with appropriate perspective distortion and frame synchronization. The terms overlay and superimpose are used herein to mean that at the particular location or area where one image is overlaid or superimposed on another image, the overlaid or superimposed image is visible and the other image is not visible. Once the high resolution image is overlaid on the panorama or spherical video image, a view window into the spherical video image can display the superimposed images in a conventional manner.

The embodiment of the rendering algorithm described here assumes that one has a sequence of high resolution images that are to be superimposed on a sequence of view windows of panoramas. The frame rate of the high resolution sequence need not be the same as the frame rate of the sequence of panoramas. The algorithm maps each high resolution image to the closest (in time) panorama. The CD which is submitted with this application and which is incorporated herein by reference provides a hex listing of a program for performing the algorithm.

The following parameters are given to the algorithm or program.

File name of the AVI video. Example: "inset.avi". File is assumed to be a valid AVI animation file, whose header contains the beginning and ending frame numbers (example: AVI frames #0 through #1219).

Frame number in the AVI frame sequence at which AVI image display is to begin. Example: AVI frame #10.

Starting and ending frame numbers in the spherical frame sequence corresponding to the start and end of AVI video display. Example: Spherical frame #13,245 through #13,449.

Synchronization ratio (spherical frame rate divided by AVI frame rate). Note that this need not be equal to the nominal ratio derivable from the frame rates described in the respective file headers; the video producer has had an opportunity to override the nominal ratio to compensate for deviation of actual frame rates from the respective nominal camera frame rates). Example: 6.735 spherical frames for each AVI frame.

The operation proceeds as follows:
For each frame in the spherical video encountered during playback:
Render the current frame of the spherical video into the display window.
Let N signify the sequence number of the current frame in the spherical video. If N is greater than or equal to the spherical frame number given for starting the AVI display, and less than or equal to the given spherical end frame number, select an AVI frame for display as follows:
Compute sequence number N' in the range between starting and ending spherical frame numbers. Example: for N=13,299, given starting frame g#13,245, N' is 13,299−13,245=54.
Compute corresponding AVI frame number by interpolation as follows:

AVI frame number $M$=round((float)$N$+($N'$/given interpolation ratio))

If AVI frame number is greater than or equal to the least frame number contained in the AVI file, and less than or equal to the greatest such frame number:
    Load the bitmap representing the selected AVI frame from the AVI file and render the bitmap M onto the spherical image drawn for spherical frame N.
End If
End If
End For each The following parameters are given to the algorithm or program from the meta data that accompanies the images.

Position in polar coordinates (heading, pitch, and bank (rotation off the horizontal)) of the AVI image. Example: center of image at heading=−43.2 degrees, pitch=10.0 degrees, bank=0.0 degrees.

Scale (degrees of height and width) of the AVI image. Example: width=15 degrees, height=10 degrees.

Figure 3D:
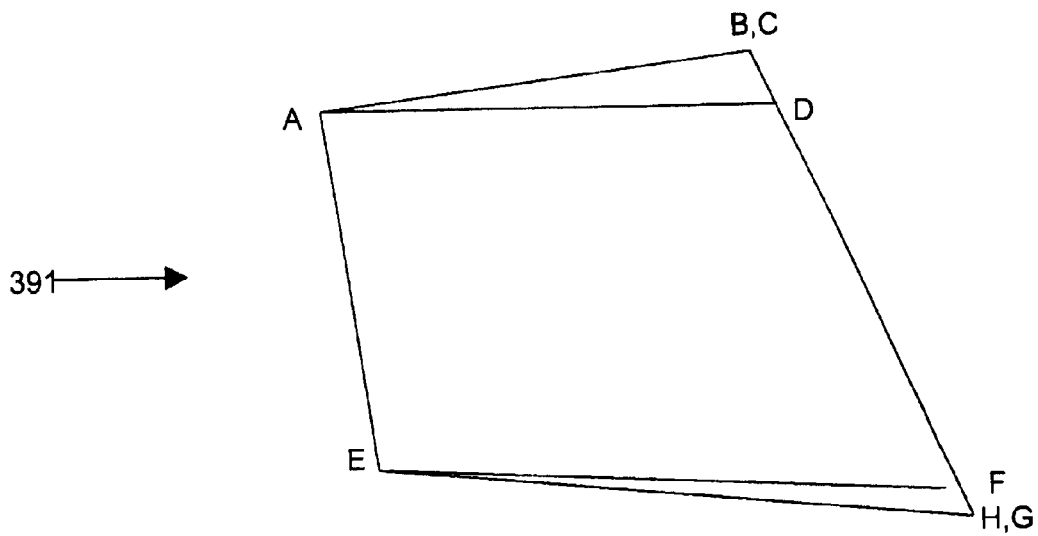
Figure 3D:
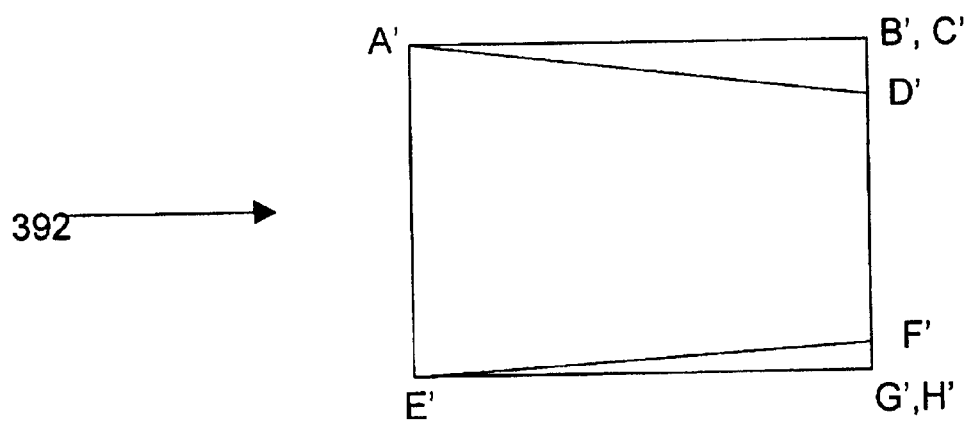

Assume that the synchronization algorithm described above has selected AVI frame M for superimposition on spherical frame N, which has already been rendered into the spherical viewing window. In FIG. 3D, image 391 represents the rectangular AVI frame to be transformed into image 392.

Note that perspective distortion of the spherical image causes "bending" of nominally orthogonal shapes, including the AVI overlay frame, which, instead of appearing rectangular in the spherical space, becomes distorted into a quadrilateral with non-orthogonal edges.

Given the position, width, and height of the AVI frame in polar coordinates, the object is to map the four corners of the rectangle into the spherical view using the same polar-to-XY transformation used in displaying the spherical image. This yields the four corners of the corresponding distorted quadrilateral, marked with labels A, B, G, E in FIG. 3D.

Using straight line segments to approximate its edges, subdivide the quadrilateral into the minimal number of trapezoids such that each trapezoid's top and bottom edges are horizontal (i.e., lying along a single raster scan line). Where left and right edges intersect at a single point, create a duplicate point supplying the fourth point in the trapezoid. Thus points B and C are actually one and the same, as are points H and G.

In the example shown in FIG. 3D, this decomposition yields three trapezoids: ABCD, ADFE, and EFGH.

Observe that each resulting trapezoid has the property that the left and right edges (e.g., AB and DC) span the exact same number of scan lines. Each horizontal edge resides on a single scan line (note edge BC consists of a single pixel).

For each trapezoid:
Map each vertex (x,y) of the trapezoid to the corresponding pixel position (u,v) in the bitmap representing the AVI frame. Example: ABCD maps to A'B'C'D'.
For each scan line s intersected by the interior of the trapezoid:
Compute the left and right endpoints $(x_L, y_L)$ and $(X_R, y_R)$ of the scan line segment to be rendered into the display window, by linear interpolation between vertices. For example, if ABCD is 23 units high (i.e., intersects 24 scan lines),
the first scan line iteration will render from A to D;
the second, from (A+((A→B)/23)) to (D+((D→C)/23));
the third, from (A+(2*(A→B)/23)) to (D+(2*(D→C)/23));
etc., with the final scan rendering a single pixel at B (=C).
For each endpoint above, compute the corresponding AVI bitmap location $(u_L, v_L)$ or $(u_R, v_R)$ endpoints. Compute AVI endpoints by linear interpolation between AVI vertices. Again, given that ABCD is 23 units high (i.e., intersects 24 scan lines),
the first scan will sample AVI pixels from A' to D';
the second, from (A'+((A'→B')/23)) to (D'+((D'→C')/23));
the third, from (A'+(2*(A'→B')/23)) to (D'+(2* (D'→C')/23));
etc., with the final scan sampling a single AVI pixel at B' (=C').
Render the scan line from $(x_l, y_l)$ to $(x_r, y_r)$, obtaining the color values at each destination pixel by sampling the AVI bitmap at the corresponding pixel location. Computation of the AVI pixel location is done by linear approximation. For example, if the first scan segment A→B is 112 units long (i.e., contains 113 pixels),

--- the color value for the starting pixel at A
$(x_A, y_A)$ is obtained from the AVI bitmap at
location A' $(u_{A\square}, v_{A\square})$;
for the next pixel $(x_A+1, y_A)$,
$(u_{A\square}$ + round$(((u_{B\square}-u_{A\square})/112.0)$, $v_{A\square}$ + round$(((v_{B\square}-v_{A\square})/112.0))$;
the third pixel $(x_A+2, y_A)$,
$(u_{A\square}$ + round$(2.0 * (u_{B\square}-u_{A\square})/112.0)$, $v_A$ + round$(2.0 * v_{B\square}-v_{A\square})/112.0))$;
etc., with the final color value coming from B' $(u_{B\square}, v_{B\square})$.
End For Each
End For Each.

---

A program that performs the above operations is appended to the above referenced applications. The program provided on the CD appended to the above referenced applications is hereby incorporated herein by reference.

Figure 5:
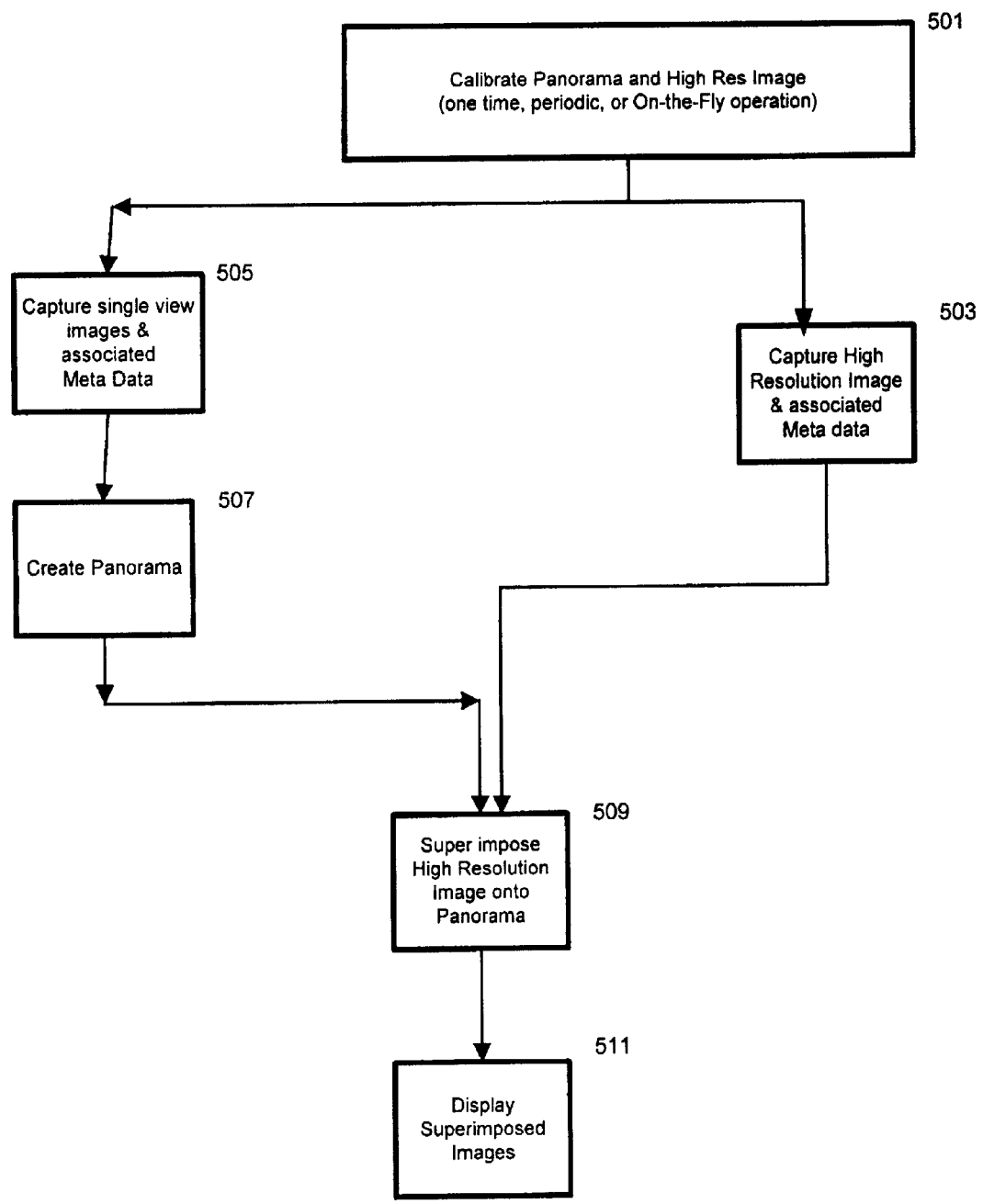
FIG. 5 is a flow diagram illustrating the operation of the system.

FIG. 5 is a flow diagram that shows the major steps in the operation of the first embodiment of the invention. First, as indicated by block 501, the system is calibrated. The calibration results in data that coordinates the position of the high resolution image with positions in a seamed panorama so that the high resolution image can be positioned correctly. This calibration takes into account peculiarities in the lenses, the seaming process, and the mechanical linkage. The calibration can be done prior to taking any images, or it can be aided or replaced by pattern matching programs which use patterns in the images themselves to match and align the images. Next as indicated by blocks 505 and 503 a set of images is captured. Meta data related to the images is also captured and stored. The images other than the high resolution image are seamed as indicated by block 507. Next the high resolution image is overlaid on the panorama at the correct position as indicated by block 509. Finally the images are displayed as indicated by block 511. It is noted that the images can also be stored for later viewing in the form of individual (non-overlaid) images or in the form of a panoramic movie.

The Wide FOV reference imagery may be from a single lens and sensor or from a composite of multiple imaging sensors, which is typical in spherical systems. The calibration factors are determined relative to the composite as opposed to the individual images that make up the composite.

In embodiments where the high resolution camera has a zoom lens, the range of the FOV adjustment would typically be between 30 degrees down to one degree. However, in some applications the FOV adjustment or range could be less than one degree.

To minimize image error or artifacts caused by motion, both wide and narrow FOV lenses and sensors can be electronically triggered or exposed simultaneously. The sensors may operate at different frame rates, however whenever the Narrow FOV lens and sensor capture an image, the Wide FOV lens and sensor that align with it would ideally capture an image at the same time.

Typically in a spherical imaging system all sensors capture imagery at least 15 FPS. A Narrow FOV sensor associated with this system would also ideally synchronously capture images at 15 FPS.

In some cases, such as unmanned reconnaissance vehicles, for power and size reasons the narrow FOV sensor may capture at, for example, 5 FPS, and only the wide FOV sensor oriented in the current direction of the narrow FOV sensor would synchronously capture an image. If the narrow FOV sensor was pointed at a seam between two of the wide FOV sensors, both the wide FOV sensors and the narrow FOV sensor would synchronously capture an image. This guarantees that all narrow FOV images have wide FOV imagery available for background reference.

While the narrow FOV sensor and the wide FOV sensor may be fixed relative to one another, the narrow FOV sensor may be directable (i.e. moveable) such as a common security pan tilt camera system.

The narrow FOV sensor may be external or separated from the wide FOV imaging sensor(s). Reducing (i.e. minimizing) the distance between the sensors will reduce parallax errors.

Typically the wide FOV sensors are combined in close geometries. This reduces parallax artifacts in the wide angled imagery. Better performance is obtained when the narrow FOV lens is very closely situated to the wide FOV sensors. In the system shown in FIG. 1, the cubic geometry of sensors is assembled such that five of the six sensors have wide FOV lenses and one of the six sensors has a narrow FOV lens. The five wide FOV lenses have sufficient FOV such that they may be combined to create a seamless panoramic view in 360 degrees horizontally. The one sensor with a narrow FOV is oriented such that the imagery it captures is first reflected off a gimbaled mirror system. The gimbaled mirror system allows for 360 degrees of rotation and up to plus or minus 90 degrees of azimuth. The gimbaled mirror is under computer control for exact pointing or redirection of the imagery that the Narrow FOV sensor collects.

The cubic sensor package and gimbaled mirror allow for a minimal physical sized wide plus narrow FOV imaging system. In an alternate embodiment, the high resolution camera is a physically separated unit and it can be physically oriented independently from the other camera. Thus the camera itself is moved to capture a desired area and no mirror is needed.

In the system shown in FIG. 1A, the redirection means is under computer control. A variety of methods can be used to determine where the narrow FOV sensor is directed. One method is to allow the system operator to choose the direction. This is accomplished by displaying to the operator in real time the imagery as captured from any one or more of the wide FOV sensors of interest and with a touch screen directing the narrow FOV sensor to the same location or direction touched on the display. The touch screen device similar to a Palmtop computer typically has a wireless or Ethernet or Internet link to the camera system. This allows the operator to be a great distance from the camera system yet be able to control the camera and narrow FOV positioning system.

Another technique that can be employed to determine the direction of the Narrow FOV sensor is to attach a head tracker cube such as InertiaCube provided by InterSence Inc of Burlington, Mass., to the back of a baseball cap worn by the operator. Prior to image capture time the system is calibrated such that the output signals from the InertiaCube relate to an actual direction that the Narrow FOV positioning system may point at. The operator then "points" the bill of the baseball cap at the region he wants to have the Narrow FOV sensor capture imagery.

Another embodiment utilizes automatic sequencing or stepping the direction of the Narrow FOV sensor such that over time all possible imagery is captured within the range of motion of the Narrow FOC sensor positioning system.

Still another embodiment is based on motion detection software that analyses in real-time the images captured from all wide FOV sensors. If motion is detected on any wide FOV image, the narrow FOV positioning system is directed to that point by automatic means.

Other events that occur within the view range of the narrow FOV sensor can be associated with a preprogrammed direction such that the narrow FOV positioning system can be directed as needed. That is, the system can be programmed such that when a particular event occurs (for example, a human appears) the narrow FOV camera is pointed toward the location where the event occurred.

Whenever the image redirection system moves or positions to a new direction, some amount of time is required to allow for that motion and to allow for the gimbaled mirror to stabilize. In the preferred embodiment, the system advises the controlling software when the new position has been reached and all associated vibration has stopped. Alternately the controlling software calculates a delay time based on distance to be traveled and stabilizing time required at each possible new position. That delay time is used prior to images being captured from the narrow FOV sensor at it new position.

The controlling software tags or associates information with any image captured via the narrow FOV sensor. The direction (Heading & Pitch) as well as FOV settings will be recorded with the image. Such data is used either immediately or at a later view time to determine appropriate calibration information required to accurately overlay the narrow FOV image over the wide FOV image. Such information and the associated images can be exported to motion-detection, object recognition, and target-prosecution processes.

The overlay of the narrow FOV images may be done in real-time at capture time or later in a postproduction phase or in real-time at viewing time. In the preferred embodiment, the actual wide FOV imagery is never lost, it is only covered by the narrow FOV imagery which may be removed by the person viewing the imagery at any time.

In some surveillance applications the narrow FOV sensor will have a FOV less than a target it is intending to image. For example a ship at sea may be in a position relative to the camera system such that the narrow FOV sensor only covers $\frac{1}{10}$ of it. The narrow FOV positioning system can be automatically controlled such that the appropriate number of images is taken at the appropriate directions such that a composite image can be assembled of the ship with high-resolution detail. The system would seam the overlaps to provide a larger seamless high resolution image.

In embodiments where the camera is on a boat or ship and swells are causing the camera platform to roll relative to the image target, compensation may be done in the narrow FOV positioning system based on external roll & pitch information measured in real-time and at capture time.

It may be useful in some contexts to provide more than two resolutions (namely more than a high-resolution and a wide-FOV-lenses) within the panorama. For example, a high-resolution image could be surrounded by a mid-resolution image, both within the lower-resolution panorama. This provides graduated rings of resolution about an object of interest, providing more information about the object's immediate surroundings than about areas that are far-removed from the object. The mid-resolution image could be captured with a variable FOV lens, or with a dedicated mid-resolution lens. Upon detecting motion in an area of the lower-resolution panorama, motion-detection software may request a mid-resolution view, followed by higher-resolution view(s) within the mid-resolution FOV.

The system can integrate electro-optic, radar and infrared imaging. Any or all of the images (low, mid, high-resolution) can be EO (electro-optic) or IR (infrared), all one type or a mixture or both, user- or software-togglable.

The addition, insertion, or integration of other type of data into a panorama is also possible. For example instead of inserting a high resolution image, alternate embodiments could insert ranging (i.e. distance to objects in the scene) or radar images. The user or software process points a ranger or radar device in the direction of interest, and the result is overlaid and integrated within the wide-context panorama. From the end-user point of view, no matter what type of data is inserted or overlaid, the system wraps visual context around objects of interest in a spherical domain.

It is noted that the system of the present invention is useful for multiple applications including security, surveillance, reconnaissance, training and missile or projectile tracking and target penetration.

In the embodiment shown in FIG. 1, the panoramic image is acquired by five single lens camera, in an alternate embodiment, the panorama is captured by a single wide angle lens. Thus the panorama can be captured by a camera with more or less than the number of lenses specifically shown herein.

In one embodiment, the high resolution camera has a fixed telephoto lens. In other embodiments, the high resolution camera has an electronically controlled zoom lens that the operator can control to any desired zoom. Naturally in such a case the meta data would include the amount of zoom used to acquire the image.

In the specific embodiment shown, the panorama covers only five sixths of a sphere. In alternate embodiments, the panorama covers various other portions of a sphere up to covering an entire sphere and down to a small portion of a sphere.

The number of cameras used to capture the panorama depends upon the particular application including such factors as the total FOV requirements and the image resolution requirements.

In another alternate embodiment, the position of the mirror 21, (i.e. the area captured by the high resolution camera) is controlled by an external system. For example, the position of the mirror could be controlled by a radar system. In such a system when the radar system detects an object or target, the high resolution camera would be pointed in the direction of the object to obtain a high resolution image of the object.

In still another embodiment, the high resolution camera is replaced by a range finding system. In such a system, the display would show a view window into a panorama, and the objects would be labeled with range information.

Figure 1B:
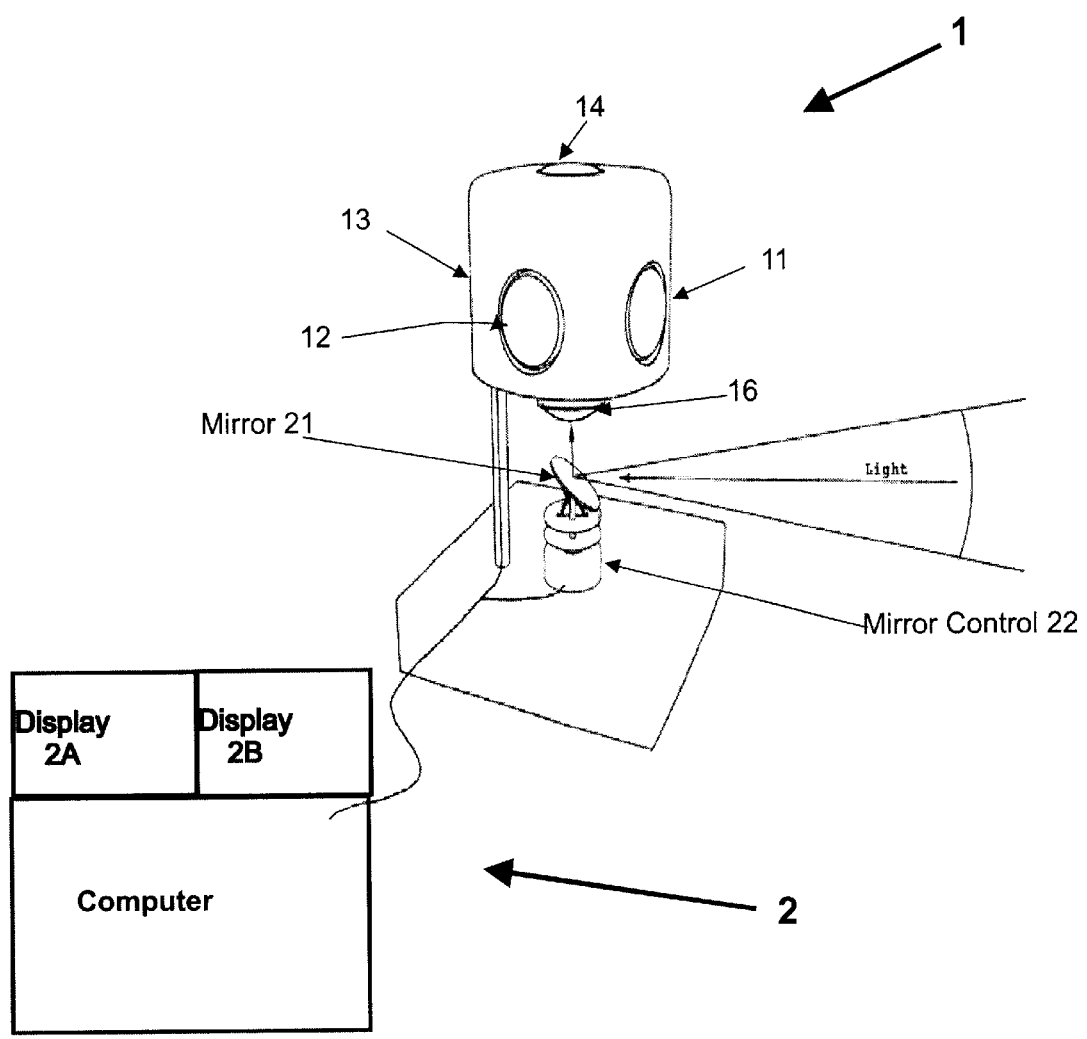

FIG. 1B shows another embodiment of the invention. In the embodiment shown in FIG. 1B, the system includes two monitors designated 2A and 2B. Monitor 2A can display the superimposed images as described in the first embodiment. Monitor 2 merely displays the high resolution image. The following underlined modification in the algorithm given above, is made in order to display the high resolution image on monitor 2B:

If AVI frame number is greater than or equal to the least frame number contained in the AVI file, and less than or equal to the greatest such frame number:
  Load the bitmap representing the selected AVI frame from the AVI file and render the bitmap M onto the spherical image drawn for spherical frame N.
  Copy the selected AVI frame from the AVI file to the separate Display 2B.
End If FIG. 6 is a flow diagram of the operation of the embodiment of the invention with two displays. The flow diagram given in FIG. 6 is identical to the previously explained flow diagram in FIG. 5 except that box 609 indicates that instead of superimposing the images on the first display, the system could be arranged to merely indicate the location covered by the high resolution image. This could be a cross hair, a dotted box or some other type of visual indicia. Block 611 indicates that the high resolution image is displayed on the second monitor.

It is noted that the two monitors shown in FIG. 1B could in fact be two windows on a single physical display unit. The technology for displaying a plurality of windows on a single physical unit is well know. As used herein the term "monitor" means either a physical display unit or a window on a physical display unit.

Other embodiments of the invention are also possible. For example, all of the single lens cameras that capture images can be set to the same exposure setting for each set of images. As is known, a CCD image detector can serve as a light meter. Prior to capturing a set of images, all the light readings can be averaged to provide one exposure setting for all the single lens cameras. Alternatively in other embodiments, each single lens camera can be set to the exposure setting which is optimal for that particular single lens camera. If each camera has its own exposure setting when a set of images is captured, the differences in exposure can be blended over the image so that artifacts are minimized at the point where the images are seamed.

If the exposure settings for the single lens cameras are not identical, artifacts may appear along the line where images with different exposure settings are seamed. Thus the luminance of such images can be blended. Blending such images means adjusting the luminance and/or chrominance values of pixels in the images based on the exposure settings of each of the two adjacent images.

Since images are seamed along multiple edges, the blending can not be across the entire image. FIG. 7 illustrates how the images can be blended to match at more than one seam line. Pixels in the two adjacent blending regions labeled A1 and A2 are blended based on the exposure settings used to capture Images 1 and 2. The algorithm to do this blending would adjust a pixel that fell on the seam between the two images 1 and 2 to the equivalent of having been captured at an exposure setting that is half way between the exposure setting of Image 1 and the exposure setting of Image 2. The closer the pixels in region A1 are to the center of Image 1, the more the adjustment would be weighted in favor of the exposure setting of Image 1. At the extreme, the pixel in region A1 closest to the center of Image 1 would be weighted almost entirely in favor of the exposure setting of Image 1 and almost none in favor of the exposure setting of Image 2. Regions B1 and B3 would be blended in a similar fashion, etc.

The calibration relevant to the present invention is the calibration of the location of the high resolution image relative to the wide angle lens. It is noted that the cameras can be calibrated as described in the referenced applications to facilitate seaming the images. Furthermore for various other reasons, calibration can be over the entire face of the image rather than just on the edges of the image. While the above referenced applications describe one image seaming technique, it should be understood that various other seaming techniques can be used.

While as described the system includes a single high resolution camera, it should be understood that in other embodiments, there can be a plurality of high resolution cameras. In such embodiments, there would be one overlaid area for each high resolution camera, or alternatively, one monitor for each high resolution camera.

It will be understood by those skilled in the art, that while the invention has been described with respect to several embodiments, other changes in form and detail may be made without departing from the spirit and scope of the invention. The applicant's invention is limited only by the appended claims.

We claim:

1. An image capture and rendering system, comprising:
   a first image capture device for capturing a first image at a first resolution, the first image containing an object;
   a second image capture device for capturing a second image at a second resolution higher than the first resolution, the second image containing at least a portion of the object; and
   a rendering system for superimposing the second image on the first image, wherein the second image is oriented within the first image such that portions of the object are substantially continuous across boundaries between the first image and the second image.

2. The system of claim 1, wherein the first image capture device and the second image capture device are mounted on a platform that moves relative to the object, and the rendering system uses metadata indicative of the movement to compensate at least one of the first image and the second image.

3. The system of claim 1, wherein the first image is a panoramic image generated by seaming together a plurality of images captured by the first image capture device.

4. The system of claim 1, wherein the rendering system superimposes the second image on the first image using metadata associated with at least one of the first image and the second image, wherein metadata is used to orient the second image within the first image such that portions of the object are substantially continuous across boundaries between the first image and the second image.

5. The system of claim 1, wherein the second image capture device captures a third image having an image resolution that is higher than the resolution of the first image and lower than the resolution of the second image, and the rendering system superimposes the second image over the third image, which is superimposed over the first image.

6. The system of claim 1, wherein the first image capture device comprises a plurality of single lens cameras for capturing a plurality of images which are seamed together into a panoramic image, and the rendering system blends the images along seam lines between the images to minimize artifacts around the seam lines.

7. The system of claim 1, wherein the position of the second image capture device is controlled by a sensor system and the rendering system superimposes sensor data associated with the object on at least one of the first and second images.

8. The system of claim 1, wherein calibration data is used to orient the second image within the first image such that portions of the object are substantially continuous across boundaries between the first image and the second image.

9. An image capture and rendering system, comprising:
a first image capture device for capturing a first image of a scene containing an object;
a second image capture device for capturing a number of images of the object, wherein each image contains at least a portion of the object; and
a rendering system for seaming together the number of images of the object into a composite object image and superimposing the composite object image on the first image, wherein the composite object image is oriented within the first image such that portions of the object are substantially continuous across boundaries between the first image and the second image.

10. An image capture and rendering system, comprising:
a first image capture device for capturing a first image at a first resolution, the first image containing an object;
a second image capture device for capturing a second image at a second resolution higher than the first resolution, the second image containing at least a portion of the object; and
a rendering system for superimposing the second image on the first image, wherein pattern matching is used to orient the second image within the first image such that portions of the object are substantially continuous across boundaries between the first image and the second image.

11. A method of capturing and rendering images, comprising:
capturing a first image at a first image resolution, the first image containing an object;
capturing a second image at a second image resolution higher than the first image resolution, the second image containing at least a portion of the object; and
superimposing the second image on the first image using metadata associated with at least one of the first image and the second image, wherein the second image is oriented within the first image such that portions of the object are substantially continuous across boundaries between the first image and the second image.

12. The method of claim 11, further comprising:
capturing a third image having an image resolution that is higher than the resolution of the first image and lower than the resolution of the second image;
superimposing the second image over the third image; and
superimposing the third image over the first image.

13. The method of claim 11, further comprising:
capturing a plurality of images;
seaming together the plurality of images into a panoramic image; and
blending seam lines between the images to minimize artifacts around the seam lines.

14. The method of claim 11, further comprising:
superimposing sensor data associated with the object on at least one of the first and second images.

15. The method of claim 11, further comprising:
using calibration data to orient the second image within the first image such that portions of the object are substantially continuous across boundaries between the first image and the second image.

16. A method of capturing and rendering images, comprising:
capturing a first image of a scene containing an object to be imaged;
capturing a number of images of the object, wherein each image contains a portion of the object;
seaming together the number of images of the object into a composite object image; and
superimposing the composite object image on the first image, wherein the composite object image is oriented within the first image such that portions of the object are substantially continuous across boundaries between the first image and the second image.

17. A method of capturing and rendering images, comprising:
capturing a first image at a first resolution, the first image containing an object;
capturing a second image at a second resolution higher than the first resolution, the second image containing a portion of the object; and
superimposing the second image on the first image, wherein pattern matching is used to orient the second image within the first image such that portions of the object are substantially continuous across boundaries between the first image and the second image.

18. A computer readable medium having instructions contained thereon, which, when executed by a processor in an image rendering system, cause the processor to perform the operations of:
receiving a first image at a first resolution, the first image containing an object;
receiving a second image at a second resolution higher than the first image resolution, the second image containing at least a portion of the object; and
superimposing the second image on the first image, wherein the second image is oriented within the first image such that portions of the object are substantially continuous across boundaries between the first image and the second image.

19. A computer readable medium having contained thereon instructions, which, when executed by a processor in a image rendering system, cause the processor to perform the operations of:

receiving a first image of a scene containing an object to be imaged from a first image capture device;

receiving a number of images of the object from a second image capture device, wherein each image contains at least a portion of the object;

seaming together the number of images of the object into a composite object image; and superimposing the composite object image on the first image using metadata associated with at least one of the first image and the composite object image, wherein the composite object image is oriented within the first image such that portions of the object are substantially continuous across boundaries between the first image and the second image.

20. A computer readable medium containing instructions thereon, which, when executed by a processor in an image rendering system, cause the processor to perform the operations of:

receiving a first image at a first resolution from a first image captured device, the first image containing an object;

receiving a second image from a second image capture device, the second image having a second resolution higher than the first resolution and containing at least a portion of the object; and superimposing the second image on the first image, wherein pattern matching is used to orient the second image within the first image such that portions of the object are substantially continuous across boundaries between the first image and the second image.

21. An image capture and rendering system, comprising:

means for capturing a first image at a first resolution, the first image containing an object;

means for capturing a second image at a second resolution higher than the first image resolution, the second image containing at least a portion of the object; and means for superimposing the second image on the first image, wherein the second image is oriented within the first image such that portions of the object are substantially continuous across boundaries between the first image and the second image.

* * * * *

UNITED STATES PATENT AND TRADEMARK OFFICE
CERTIFICATE OF CORRECTION

PATENT NO. : 6,738,073 B2
DATED : May 18, 2004
INVENTOR(S) : Michael C. Park and G. David Ripley It is certified that error appears in the above-identified patent and that said Letters Patent is hereby corrected as shown below:

<u>Title page,</u>
Item [63], Related U.S. Application Data, replace "which is a continuation-in-part of application No. 09/338,790," with -- which is a continuation of application No. 09/338,790, --.
Item [56], References Cited, U.S. PATENT DOCUMENTS, add:
-- 6,252,603 A    06/2001    Oxaal --

Signed and Sealed this

Twenty-third Day of November, 2004

JON W. DUDAS
*Director of the United States Patent and Trademark Office*